(12) United States Patent
Blackburn, Jr.

(10) Patent No.: US 12,194,962 B2
(45) Date of Patent: Jan. 14, 2025

(54) HITCH ATTACHED CONSTRUCTION EQUIPMENT TRANSPORTATION DEVICE AND METHOD

(71) Applicant: Larry Jay Blackburn, Jr., Verdi, NV (US)

(72) Inventor: Larry Jay Blackburn, Jr., Verdi, NV (US)

( * ) Notice: Subject to any disclaimer, the term of this patent is extended or adjusted under 35 U.S.C. 154(b) by 0 days.

(21) Appl. No.: 18/229,650

(22) Filed: Aug. 2, 2023

(65) Prior Publication Data

US 2024/0042940 A1   Feb. 8, 2024

Related U.S. Application Data

(60) Provisional application No. 63/394,574, filed on Aug. 2, 2022.

(51) Int. Cl.
*B60R 9/06* (2006.01)
*E01C 19/40* (2006.01)

(52) U.S. Cl.
CPC .............. *B60R 9/06* (2013.01); *E01C 19/402* (2013.01)

(58) Field of Classification Search
CPC ....... B60P 1/4421; B60R 9/06; B60R 9/0426; E01C 19/402; E01C 19/35; E01C 19/38; E01C 21/00; E01C 19/34; B66B 9/025; B66B 9/0823; B66B 11/0446
USPC .......................... 224/408; 414/462; 187/267
See application file for complete search history.

(56) References Cited

U.S. PATENT DOCUMENTS

| | | | | |
|---|---|---|---|---|
| 3,180,503 | A * | 4/1965 | Shaw | B60P 1/4421 414/545 |
| 3,277,801 | A * | 10/1966 | Horvath | E02D 3/068 404/133.1 |
| 5,431,522 | A * | 7/1995 | Ross | A61G 3/062 224/521 |
| 6,524,054 | B2 * | 2/2003 | Maney | B60P 1/4421 414/462 |
| 6,561,745 | B2 * | 5/2003 | Rountree | B62B 1/10 414/490 |
| 7,188,856 | B2 * | 3/2007 | Maynard | B60R 9/06 414/463 |
| 7,798,760 | B2 * | 9/2010 | Strassman | B60P 3/077 414/563 |
| 8,132,997 | B2 * | 3/2012 | Reuille | B60P 1/4421 414/545 |
| 8,985,418 | B1 * | 3/2015 | Poudrier | B60R 9/06 224/521 |
| 9,017,002 | B1 * | 4/2015 | Joynt | B60R 9/06 414/462 |
| 10,065,566 | B1 * | 9/2018 | Harbaugh | B60D 1/46 |
| 10,232,792 | B2 * | 3/2019 | Egan | B60R 9/06 |

(Continued)

*Primary Examiner* — Gregory W Adams
(74) *Attorney, Agent, or Firm* — Law Office of Long & Chybik; John D. Long, Esq (57) ABSTRACT

A vehicle-mounted transportation lift for transporting wheelless or trackless, powered, construction equipment and a method of using same; wherein the transportation lift comprises a cradle comprising a horizontally oriented plate, the plate removably secures to and supports a base of the powered walk-behind equipment; a lifting device that supports a motorized screw jack, the lifting device further being attached to an automotive vehicle; wherein the motorized linear screw actuator moves the cradle between a loading position proximate to the ground and a carrying position distal from the ground.

23 Claims, 9 Drawing Sheets

(56) References Cited

U.S. PATENT DOCUMENTS

| | | | |
|---|---|---|---|
| 2008/0044269 A1* | 2/2008 | Pradenas | B60P 3/07 414/462 |
| 2010/0224746 A1* | 9/2010 | Johnson | E21B 7/008 248/289.11 |
| 2020/0255271 A1* | 8/2020 | O'Connell | B66F 7/28 |

* cited by examiner

HITCH ATTACHED CONSTRUCTION EQUIPMENT TRANSPORTATION DEVICE AND METHOD

CROSS-REFERENCES TO RELATED APPLICATIONS

This application claims the benefit of U.S. Provisional Patent Application No. 63/394,574 filed on Aug. 2, 2023, and entitled "CONSTRUCTION EQUIPMENT TRANSPORTATION DEVICE AND METHOD", the entire contents of which are incorporated by reference.

STATEMENT REGARDING FEDERALLY SPONSORED RESEARCH OR DEVELOPMENT

Not Applicable

REFERENCE TO A "MICROFICHE APPENDIX"

Not Applicable.

FIELD OF THE INVENTION

The present invention may relate to those transportation lift devices that are used to carry wheelless and trackless powered construction equipment to and from construction sites. More particularly to such transportation lift devices that may be mounted to automotive vehicles.

BACKGROUND

The construction industry by its nature can pose a dangerous environment for workers. The movement of materials and machines at a confined building site may often lead to minor and major personal injuries to workers. One such safety issue can be the transportation to and from the construction sites of single man walk behind powered construction equipment. Such construction equipment may use vibrational or reciprocal motion to accomplish their intended purpose allowing the operator generally holding onto such equipment from behind to guide or otherwise move the equipment through such vibrational or reciprocal motion. Generally, such construction equipment does not make use of wheels or movable tracks to accommodate movement of such machinery. This kind of construction equipment could comprise machinery such as dirt compactors, cement vibrators, jack hammers, ditch diggers, and others. Customarily, a single worker may be tasked to manhandle these machines, with difficulty, to load the machines on and off of a bed of a truck bed that is subsequently used to move the loaded equipment from work site to work site. Given that these machines may be somewhat heavy and bulky, moving such equipment around for transportation purposes may be very physically demanding that over time and can take a toll on the operator's overall health and physical wellbeing. Further, loading and unloading bulky and heavy equipment upon a truck bed several feet from the ground could increase the possibility of work site accidents, those accidents could range from minor to serious. These resulting worker injuries, while impacting the individual worker's health, could also lead to a significant economic impact to the employer as the injuries relate to workplace manpower losses, increased injury claim compensation costs, increased insurance premiums and the like.

As such, there may be a need for a device that may ameliorate a worker's need to lift up and down such construction equipment onto and off of a truck bed for transportation from work site to work site. Such a device should be easy and safe to use; reduce the need to manually lift or lower the construction equipment for transport; and allow the equipment's own operating motion to load the machine upon the said device.

SUMMARY OF ONE EMBODIMENT OF THE INVENTION

Advantages of One or More Embodiments of the Present Invention

The various embodiments of the present invention may, but do not necessarily, achieve one or more of the following advantages:

to provide a transportation lift device that may be mounted to an automotive transport to generally allow a powered construction machinery to be lifted by the transportation lift device into a loaded position for transportation to another location by the automotive transport;

the ability to avoid the need to manhandle heavy machinery up onto and then down off of a bed of truck for transportation to a remote location;

to provide a screw jack powered lift device that raises and lowers a cradle that can removably hold a walk-behind powered construction equipment that lacks wheels or movable tracks;

the ability to relocate non-wheeled or tracked-walk behind powered construction equipment without having to manually load such equipment upon a bed of an automotive vehicle for transport;

to provide a small compact mechanical linear screw actuator to lift a heavy piece of construction equipment into a transportation position above the ground for transport by an automotive vehicle; and the ability to rotate a transportation lift device between a storage position and operative position, the storage and operative positions being perpendicular to each other.

These and other advantages may be realized by reference to the remaining portions of the specification, claims, and abstract.

BRIEF DESCRIPTION OF ONE EMBODIMENT OF THE PRESENT INVENTION

One possible solution to this construction equipment transportation issue could be the present invention, a vehicle mounted transportation lift device that may present an open-ended cradle that is movably connected to a lifting device that could be mounted to a vehicle for transportation of powered, walk-behind construction equipment. The invention may allow a powered, walk-behind construction equipment (generally lacking tracks or wheels for transport) to be moved onto by the machine's own power (e.g., the rammer could be hopped onto and out of place via the ground) upon a cradle that may be located proximate to the ground in the loading position. The cradle with the secured load can then be moved upward away from the ground by the lifting device (e.g., a motorized rotating screw jack or a mechanical linear actuator) to a raised transportation position. Once located in the raised position, the vehicle (e.g., a suitable automotive vehicle such as a pickup truck or like) can be taken to a desired construction site (e.g., a location remote from where the machine was loaded by the invention) along with the securely loaded construction equipment.

At the desired construction site, the lifting device can then be used to lower the loaded cradle back down on the ground and the loaded machine can be driven off the cradle to a desired location at the construction site. By eliminating the physical lifting and lowering by a worker of such construction equipment, the likelihood of worker injuries may significantly decrease in relation to the transportation of various powered, walk-behind constriction equipment.

Another possible embodiment could be a vehicle-mounted transportation lift used for transporting wheelless and trackless, powered, walk-behind construction equipment comprising a cradle comprising a plate that secures and supports a base of the wheelless and trackless, powered, walk-behind construction equipment, the cradle pivotally connects to a bottom of a shaft to provide the cradle with an open horizontal operational position, the top of the shaft supporting a shaft holder that projects outward perpendicularly from the shaft; a lifting device comprising an L-shaped tubing comprising a double open-ended leg portion that movably slides over the shaft and a foot portion perpendicularly connected to the leg portion, a linear actuator movably connects the shaft holder to foot portion; the foot portion further connects the vehicle-mounted transportation lift to a motorized vehicle; wherein activation of the linear actuator can move a length of the shaft through L-shaped tubing to move the cradle either away from or closer to the ground.

Yet another possible embodiment could be a combination of a vehicle-mounted transportation lift device used for transporting a wheelless and trackless, powered, walk-behind construction equipment and the wheelless and trackless, powered, walk-behind construction equipment comprising: the vehicle-mounted transportation lift device used for transporting wheelless or trackless powered, walk-behind construction equipment comprising a cradle comprising a plate that secures and supports a base of the wheelless or trackless powered walk-behind construction equipment, the plate pivotally connects to a bottom of a shaft, the top of the shaft supporting of a shaft holder that projects outward perpendicularly from the hollow shaft; a lifting device comprising an L-shaped tubing made up of a double open-ended leg portion that movably receives the hollow shaft and a foot portion that is perpendicularly connected to the leg portion, a linear actuator that movably connects the shaft holder to foot portion; the foot portion further connects the invention to a motorized vehicle; wherein activation of the linear actuator can move the shaft through the hollow interior of the leg portion to move the cradle either away from or closer to a ground; the wheelless and trackless, powered, walk-behind construction equipment comprising a body containing motor to impart a motion to the bottom of the body, and body further supporting operating controls and one or more handles for gripping and controlling the movement of the body; wherein the body is at least reversibly secured to the cradle and the linear actuator movably engages to the cradle to moves the cradle and secured wheelless and trackless, powered, walk-behind equipment relative to a ground. Still yet another possible embodiment could be a method of operating a vehicle-mounted transportation lift used for transporting wheelless and trackless, powered, walk-behind construction equipment comprising the following steps: providing the vehicle-mounted transportation lift used for transporting wheelless and trackless, powered, walk-behind construction equipment, the lift comprising a cradle comprising a plate that secures and supports a base of the wheelless and trackless powered walk-behind equipment, the plate pivotally connects to a bottom of a shaft to provide the plate with an open horizontal operational position and vertical stowed position, the top of the shaft supporting a shaft holder that projects outward perpendicularly from the shaft; a lifting device that comprising an L-shaped tubing comprising a double open-ended leg portion that movably receives the hollow shaft and a foot portion perpendicularly connected to and end of the leg portion, a linear actuator movably connecting shaft holder to the foot portion; the foot portion further connects the lift to a motorized vehicle; wherein activation of the linear actuator can moves the shaft relative to the L-shaped tubing to move the cradle either away from or closer to a ground; providing the wheelless and trackless, powered, walk-behind construction equipment; connecting the vehicle-mounted transportation lift to a motorized automotive vehicle; activating a first time the vehicle-mounted transportation lift to bring the plate proximate to a ground; activating a first time the wheelless or trackless, powered, walk-behind construction equipment and loading the said wheelless or trackless, powered walk behind construction equipment upon the plate; activating a second time the vehicle-mounted transportation lift to move the cradle and loaded wheelless and trackless, powered, walk-behind construction equipment away from the ground; and moving the vehicle, the attached vehicle-mounted transportation lift and the loaded wheelless and trackless, powered, walk-behind construction equipment to a remote site.

The above description sets forth, rather broadly, summaries of various embodiments of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
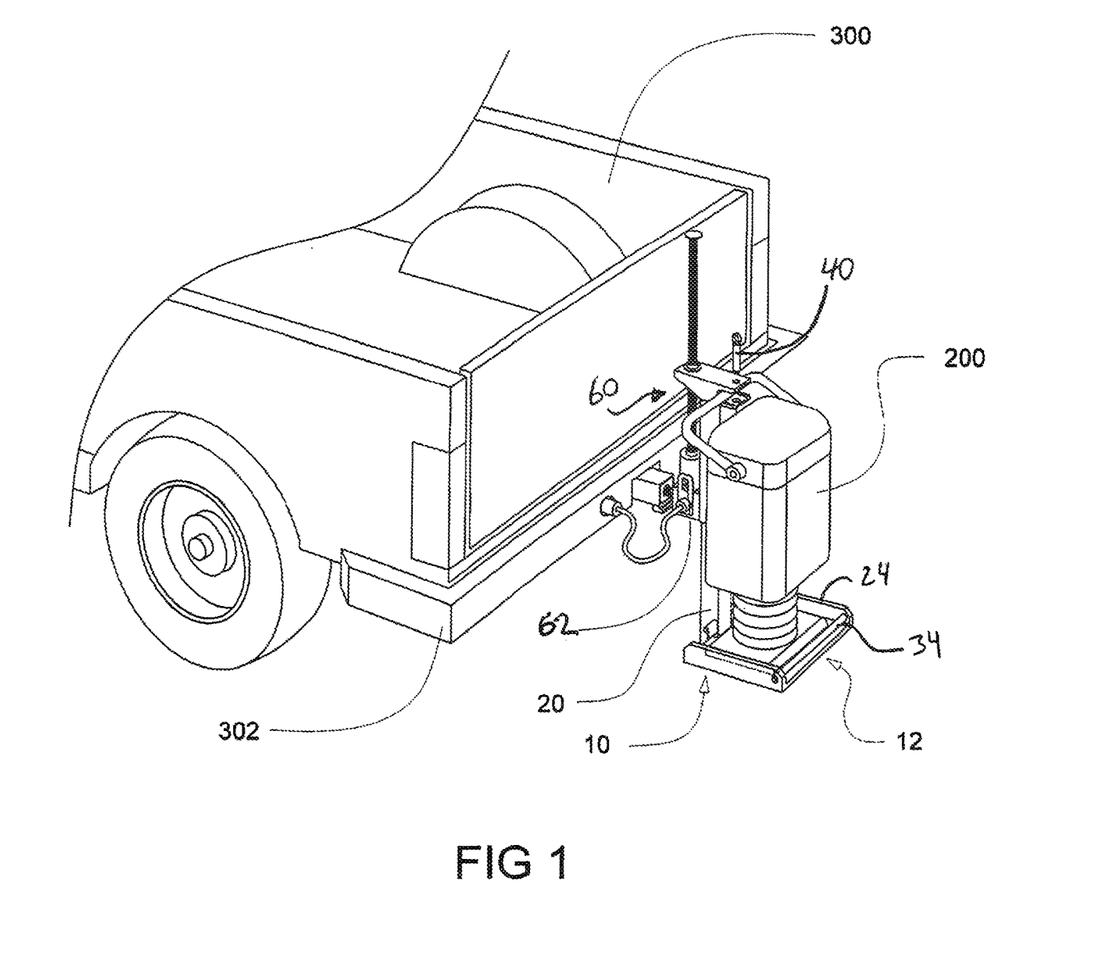
FIG. 1 is substantially a perspective view of one embodiment of walk behind construction equipment being loaded upon the present invention.
Figure 2:
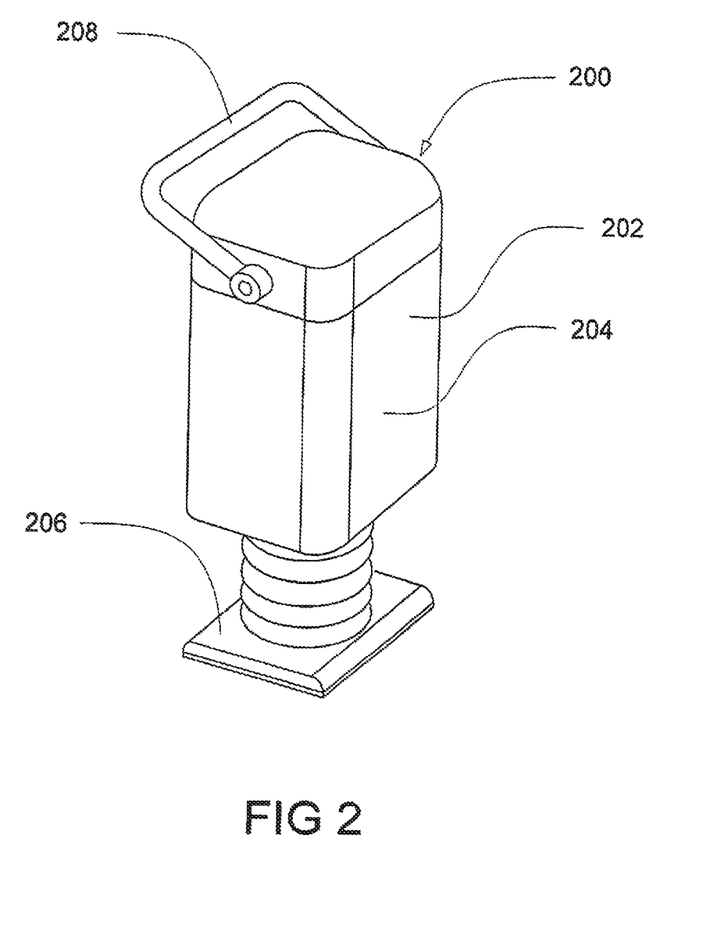
FIG. 2 is substantially a perspective view of one possible embodiment of the walk behind construction equipment.
Figure 7:
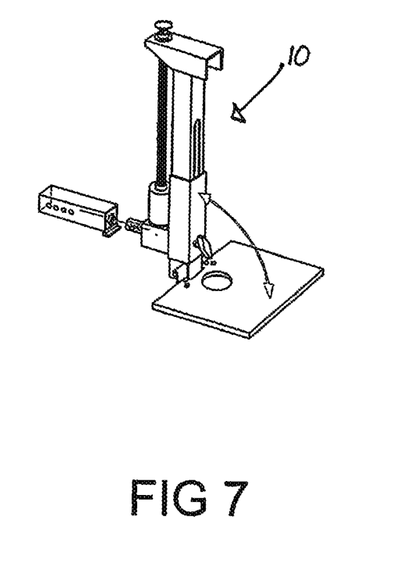
FIG. 7 is substantially a perspective cutaway view of one possible embodiment of the vehicle mounted transportation device in a raised position.

As substantially shown in FIGS. 1, 2 and 7, the present invention 10 could be a vehicle-mounted transposition device 20 for engaging and lifting wheelless and trackless, powered, walk-behind construction equipment 200 by an automotive vehicle 300 (e.g., such as motorized wheeled truck or tractor, a motorized tracked prime mover or the like. Such powered construction equipment like for movement like walk-behind plate compactors, rammers, jack hammers and alike are generally lacking wheels or tracks for movement and may use vibrational or reciprocal (e.g., jumping) motion to accomplish equipment's design or intended purpose allowing the operator generally holding onto such construction equipment 200 from behind to guide or otherwise move the construction equipment 200. One possible example of the operate from behind powered construction equipment 200 that is wheelless or trackless could be a ground compactor or tamper 202 having an upright body 204 holding a powering motor with reciprocating mechanism (neither are shown) that generally movably attaches to a base plate 206 at the bottom end of the upright body 204. The top end of the upright body 204 could support operating handles 208 and machine controls. Upon activation, the tamper 202 begins its "jumping" motion using the weight of the tamper 202 to tamper or compact the ground 12 to which the construction equipment 200 is applied. The operator (not shown) may grasp the construction equipment 200 by the operating handles 208 and maneuvers the tamper 202 as the device "jumps."

Figure 3A:
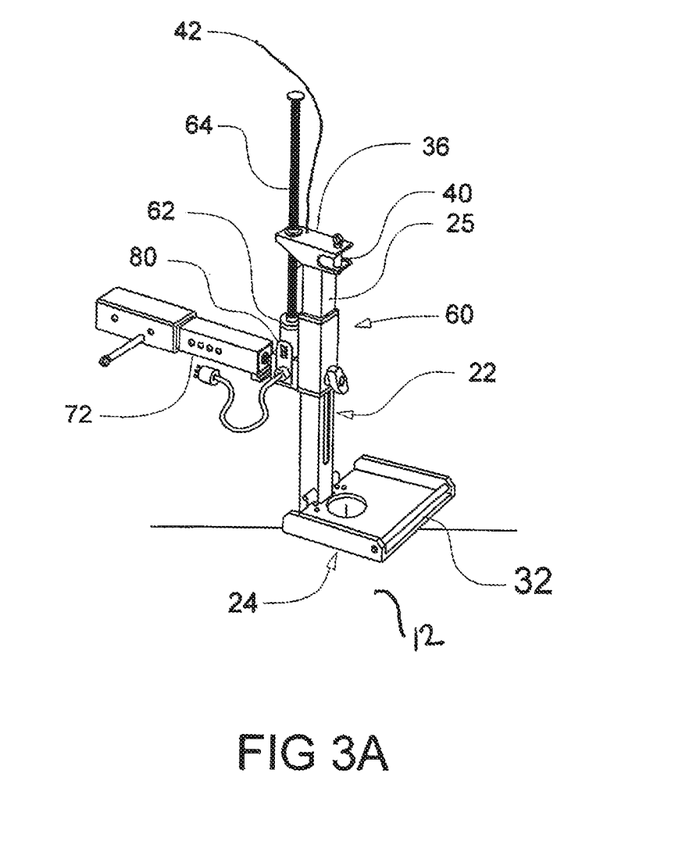
FIG. 3A is substantially a perspective view of one possible embodiment showing the vehicle mounted transportation device in the lowered or loading position.
Figure 3B:
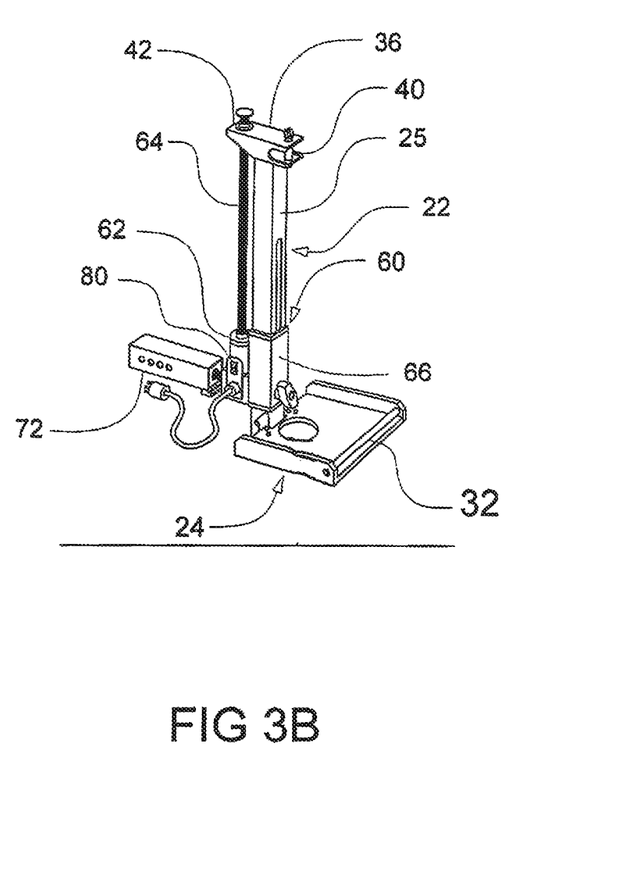
FIG. 3B is substantially a perspective view of one possible embodiment of the vehicle mounted transportation device in the lowered or loading position.

As substantially shown in FIGS. 3A and 3B the vehicle-mounted transportation device 20 could comprise a cradle mechanism 22 movably connected to a lift mechanism 60. In one embodiment the lift mechanism 60 further providing a bar or hitch insert 72 that removably attaches to the open hitch mount 310 as applied to an automotive vehicle 300 such as flatbed truck, pickup truck or the like (substantially shown in FIG. 1). In another embodiment—not shown, wherein a cutout in the side of a truck bed of the automotive vehicle allows to the invention 10 to be placed next to a truck bed frame of the truck bed to allow the lift mechanism 60 to be directly attached to the truck bed frame.

Figure 4:
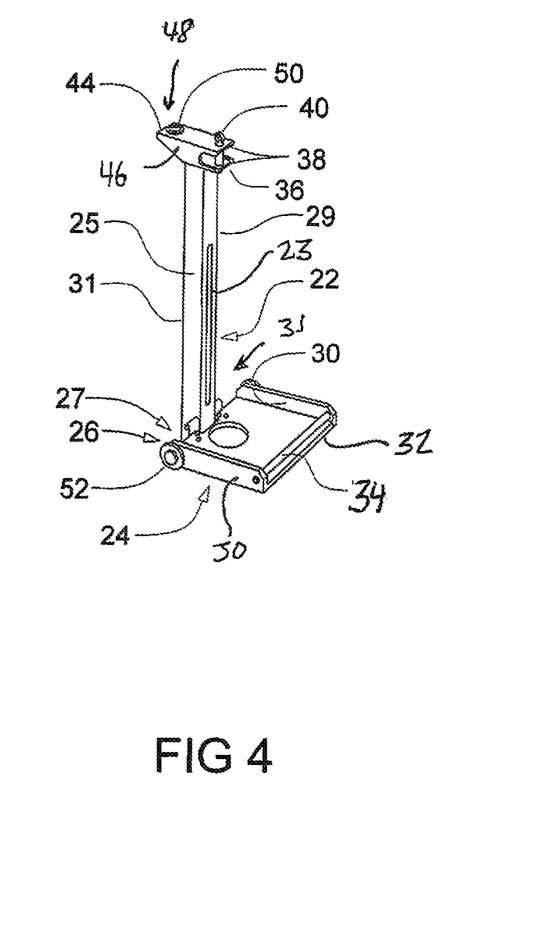
FIG. 4 is substantially a perspective cutaway view of one possible embodiment of the cradle mechanism.

As substantially shown in FIG. 4, the cradle mechanism 22 could comprise an open-sided cradle 24 shaped like a dust pan and four-sided hollow square tube or shaft 25 that at one or rear cradle edge 26 is perpendicularly connected to front side of the shaft 25 at a bottom shaft end 27 of the shaft 25. The open-sided cradle 24 could comprise flat rectangular plate 28 that has continuously connected raised plate ridges 30 on three of the cradle's four edges, the fourth or front plate edge 32 being flat (allowing the construction e to be "walked" onto the open-sided cradle 24 is located opposite of the rear cradle edge 26 to which the shaft 25 is connected in an upright and perpendicular manner to the open-sided cradle 24. Two of the opposing plate ridges 30 could be movable penetrated by a retaining rod 34 that could removably placed over the front edge of the base plate 206 (substantially shown in FIGS. 1 and 2) to hold the base plate 206 (hence the construction equipment 200) onto the open-sided cradle 24 during transportation/cradle operation.

Towards the top shaft end 29 could be U-shaped holder or shaft holder 36 (e.g., two spaced part holder plates 38 held apart in parallel horizontal orientation to one another) that projects over a portion of the open-sided cradle 24. Both holder plates 38 could be removably penetrated by a second retaining rod 40 that may be held in a parallel orientation to the shaft 25. An upper portion of the loaded machinery (e.g., operating handle 208) could be removably received between the holder plates pair 38 and be held there by the second retaining rod 40. In this manner, the cradle mechanism 22 could retain the loaded at the top and bottom of construction equipment 200 (as substantially shown in FIG. 1) to provide a stable and secure equipment retention. On the back side 31 of the shaft 25 (e.g., opposite of the front side) where the shaft 25 connects to the open-side cradle 24 could a threaded rod holder 42. The threaded rod holder 42 could comprise a horizontally oriented anchoring plate 44 held between a pair of spaced apart, vertically oriented anchoring arms 46 held in parallel orientation to each other. The anchoring plate 44 being projecting outward and perpendicular to the shaft 25. The anchoring plate 44 could be penetrated by a rod aperture 48 with at least one threaded nut 50 affixed to the anchoring plate 44 over the rod aperture 48. A threaded rod 64 from the lift mechanism 60 could movably engage the threads of the threaded nut 50 so that as the threaded rod 64 is rotated by the lift mechanism 60 the anchoring plate (and hence the shaft 25 with attached open side cradle 24) moves up or down along the threaded rod 64 as the threaded rod 64 rotates.

In one version of the cradle mechanism 22, the open-sided cradle 24 could be further coupled to a set of wheels 52 (as substantial show in FIG. 3C) at the edge of the open-sided cradle 24 hosting the cradle's attachment to the shaft 25. In this manner, when the automotive vehicle 300 is needed to tow something besides the invention 10, the invention 10 can be removed from the vehicle (e.g., the vehicle's hitch mechanism 302) (as substantially shown in FIG. 1). Rather than having an operator (e.g., construction worker—not shown) lift or drag the invention 11 to desired storage area, the worker can tilt back upon the shaft 25 to place the invention 10 upon its wheels 52 and push the wheeled invention 10 to the desired storage area like a dolly.

Figure 5:
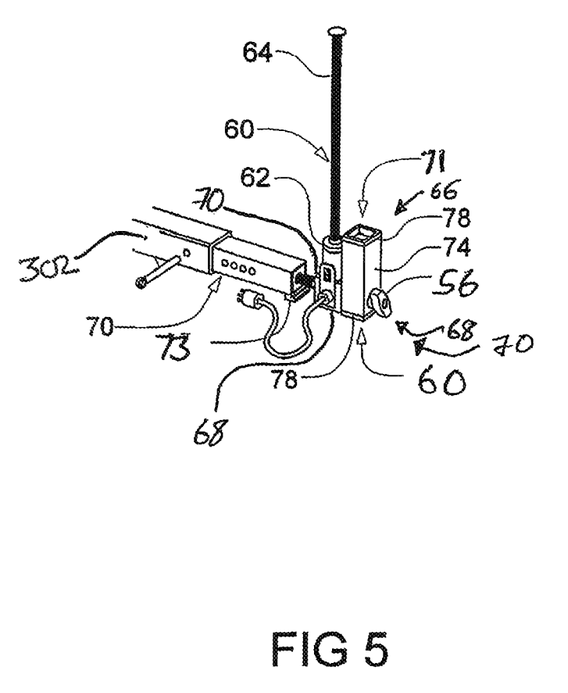
FIG. 5 is substantially a perspective view of one possible embodiment of the lift mechanism.

As substantially shown in FIG. 5, the lift mechanism 60 could comprise an actuator 62 (e.g., a geared electric motor) that connects to the threaded rod 64 to substantially rotate the threaded rod 64 about the rod's longitudinal central axis (not shown). The actuator 62 (e.g., actuator portion containing the motor and gears) generally being mounted the foot 68 of the L-shaped hollow tubing 66. In one possible embodiment, An open tube end 70 of the foot 68 could receive a solid length of bar that may act as the hitch insert 72 to allow the attachment of the invention 10 to an automotive hitch mechanism 302 of the vehicle 300. The leg portion 74 of the L-shaped tubing 66 may form a double open-end leg channel 70 that movably accepts the shaft 25. In this manner, as the threaded rod 64 rotates, the threaded rod 64 moves the shaft 25 through the double opened ended leg channel 70 as formed by the leg portion 74 of the L-shaped tubing 66, the mutual four-sided nature of the shaft 25 and the leg portion 74 prevents unwanted twisting of the shaft 25 within the leg portion 74. Polymer end collars 78 at each end of the double open-end leg channel 70 could assist with moving the shaft 25 through the leg portion 74.

In one possible version as shown in FIGS. 8, 9, 10 and 11, the bar 72 could form a pivotal attachment 54 to the foot portion 68 to allow the invention 10 to be pivoted between a vertical transportation/operating positon to a horizontal storage position. A threaded T-shaped rod 56 could penetrate through the centerline of the foot portion 68 to pivotally connect the L-shaped tubing 66 to bar 72. In doing so the threaded T-shaped rod 56 could movably pass through longitudinal slots 23 running on opposite sides in parallel on the shaft 25. In this manner as the shaft 25 is moving through the L-shaped tubing 66 when the cradle mechanism 22 is moved up and down, the threaded T-shape rod 56 could move along the lengths of the of the longitudinal slots 23 unimpeded. By slightly unscrewing the threaded T-shape rod 56, the L-shaped tubing 66 can be backed away from the edge flange 73 on the end of the bar 72. The L-shaped tubing 66 (e.g., and the remainder of the transportation device 20) can be pivoted 90 degrees to be placed into a horizontal storage position relative to the hitch 302. By tightening the threaded T-shape rod 56 to the L-shaped portion and bar 72, the L-shaped tubing 66 engages the edge flange 73 to generally hold the invention 10 in the horizontal storage position.

Figure 8:
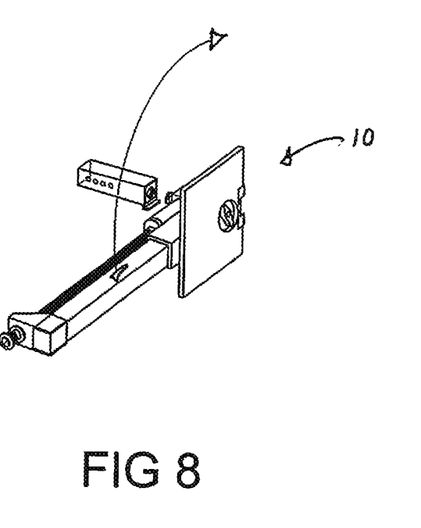
FIG. 8 is substantially a perspective cutaway showing the invention as rotated to the storage position.

This process could be reversed by backing out the threaded T-shape rod 56 to space out a distance between the bar 72 and the L-shaped tubing 66 to disengage the edge flange 73 from the L-shaped tubing 66. The remainder of the transportation device 20 can be rotated back to the vertical operating position. The threaded the threaded T-shape rod 56 can be tightened again to bring the L-shaped tubing 66 into contact with the edge flange 73 to removably hold the remainder of the transportation device 20 to the bar in the vertical operating position.

The actuator 62 could be an electric shaft motor (not shown) movably connected to a set of reduction gears (not shown) connected to the threaded rod 64 to rotate the threaded rod 64 about the thread rod's central longitudinal axis to prove the threaded rod's rotatable engagement with the threaded rod holder 42. The actuator 62 could be connected to one of several electrical systems of the supporting automotive vehicle 300 (e.g., the parking light lighting system) to energize the electric shaft motor through a control of switch 80. The electric switch 80 could control the energization of the electric shaft motor to control the direction of rotation and hence moving the shaft 25 up or down relative to the L-shaped tubing (as substantially shown in FIGS. 1 and 3.)

One possible embodiment of the invention could further comprise a covering (not shown) that could be applied over the lift mechanism 60, the shaft 25 and leg portion 74 of the L-shaped tubing to reduce the amount of debris that could get into the moving parts of the invention 10.

Figure 3C:
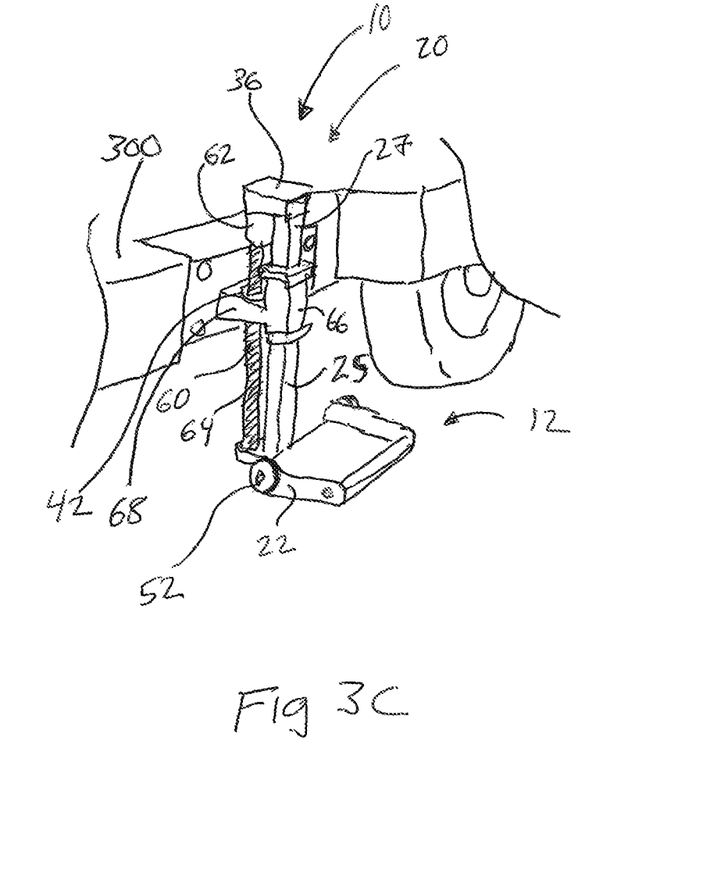
FIG. 3C is substantially a perspective view of another possible embodiment of vehicle mounted transportation device.

In another embodiment of the invention 10, as substantially shown in FIG. 3C, the motor and gears portion of the actuator 62 (e.g., a mechanical linear actuator) could be attached to the U-shaped holder or shaft holder 36 so the actuator's threaded rod 64 may be directed downward to be rotatably retained by the threaded rod holder as mounted below in the foot 68 of the L-shaped tubing 66. This second invention configuration, generally having the ability to lift or pull up the cradle load up to transportation position, may appear to be more efficient in comparison with the first invention configuration as substantially shown in FIGS. 1, 3A, and 3B. In the first invention configuration, actuator's motor and gears portion may be mounted to foot 68 of the L-shaped tubing 66 and to generally direct actuator's threaded rod 64 upward to threaded rod holder 42 as substantially mounted in U-shaped holder or shaft holder 36. In the first invention configuration, the actuator appears to push the cradle/load and in doing so may utilize takes more energy to do so.

Figure 6:
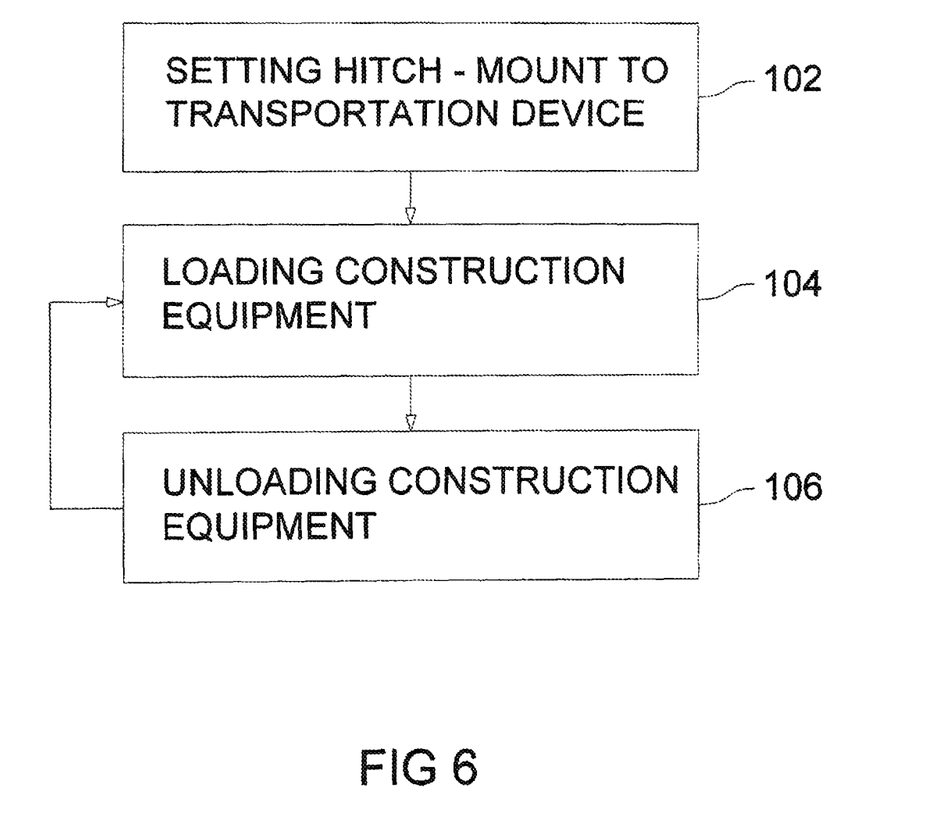
FIG. 6 is substantially a schematic flow chart for one possible embodiment of the process or method of operating the invention.

As substantially shown in FIG. 6, another embodiment of the invention 10 could be a method or a process 100 for operating hitch-mounted transposition device 20. The process 100 could start with step 102, setting the hitch-mounted transportation device, wherein, if the operator has not previously attached the device, the operator could bring (e.g., wheel) the device to the rear end of the automotive vehicle. The device could be connected to the vehicle's electrical system to allow the operation of the actuator. The energizing of the actuator could allow the L-shaped tube to move along the shaft to bring the bar up to the level of the hitch mechanism of the automotive vehicle to allow the operator to move device closer to the automotive vehicle to insert and secure the bar to the hitch mechanism. The operator could remove then the first and second retaining rods from the hitched device. At the substantial completion of step 102, the process could proceed to step 104, loading the construction equipment.

In step 104, loading the construction equipment, the operator could activate the construction equipment to move the construction equipment proximate to the hitched device. The operator carefully could reverse the orientation construction equipment to back the construction equipment onto the opened ended cradle by passing the construction equipment's foot plate through the open end of the open sided cradle. Once properly positioned upon the open sided cradle, the operator could turn off the construction equipment. The second retaining rod can be placed through the operating handle to removably secure the operating handle between the holder plate pair of the U-shaped holder or shaft holder. The operator can then re-secure the first retaining rod to the open sided cradle to hold the construction equipment's foot plate to the open sided cradle. The actuator can then be appropriately energized to cause the shaft to be moved through the leg portion to lift the loaded open-ended cradle upwards towards the L-shaped tube. As the loaded open-ended cradle has sufficiently cleared the ground 12, the actuator can be de-energized. The Automotive vehicle can then be driven to the desired remote site. As this step is substantially completed, the process could proceed to step 106, unloading construction equipment.

In step 106, unloading the construction equipment, once the automotive vehicle arrives at the desired remote site (e.g., another construction site) and is suitable parked, the actuator can be suitably energized to lower the loaded open-ended cradle down to the ground 12. The first and second retaining rods can be removed from the remaining cradle mechanism to release the construction equipment from the device. The operator can activate the construction equipment to drive the construction equipment off the open-ended cradle to a desired area at the remote site. At this point, the process 100 could proceed back to step 104 to load or reload construction equipment upon the device. Alternatively, the device could be electrically unconnected and unhitched from the vehicle could be moved (wheeled) to a storage area at the remote site.

CONCLUSION

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. A vehicle-mounted transportation lift used for transporting wheelless and trackless, powered, walk-behind construction equipment comprising:
  (A) a cradle comprising a plate that secures and supports a base of the wheelless and trackless, powered, walk-behind construction equipment, the plate pivotally connects to a bottom of a shaft, the top of the shaft supports a shaft holder that projects outward perpendicularly from the shaft;
  (B) a lifting device comprising an L-shaped tubing featuring a double open-ended leg portion that movably slides over the shaft and a foot portion that perpendicularly connects to the leg portion, a linear actuator movably connects the shaft holder to the foot portion, the linear actuator is further attached to the foot portion to project a threaded rod that movably engages a threaded rod holder as supported by the shaft holder in a manner that a rotation of the threaded rod moves the shaft along a hollow interior of the leg portion, the foot portion further connects the vehicle-mounted transportation lift to a motorized vehicle;
wherein activation of the linear actuator can move a length of the shaft through L-shaped tubing to move the cradle either away from or closer to a ground.

2. The vehicle-mounted transportation lift of claim 1 wherein the vehicle-mounted transportation lift can pivot relative to the motorized vehicle to provide vehicle-mounted transportation lift with a vertical operating position and a horizonal storage position.

3. The vehicle-mounted transportation lift of claim 2 wherein the foot portion is pivotally connects to the motorized vehicle.

4. The vehicle-mounted transportation lift of claim 1 wherein the L-shaped tubing stays stationary relative to the motorized vehicle while the shaft moves through the hollow interior of the leg portion when the linear actuator is activated.

5. The vehicle-mounted transportation lift of claim 1 wherein the vehicle-mounted transportation lift removably connects to the motorized vehicle.

6. The vehicle-mounted transportation lift of claim 1 wherein the plate further supports a set of wheels by which the operator moves the vehicle-mounted transportation lift away from the motorized vehicle when the vehicle-mounted transportation lift is disconnected from the motorized vehicle.

7. A method of operating a vehicle-mounted transportation lift used for transporting wheelless and trackless, powered, walk-behind construction equipment comprising the following steps:
  (A) providing the vehicle-mounted transportation lift used for transporting wheelless and trackless, powered, walk-behind construction equipment, the vehicle-mounted transportation lift comprising a cradle having a plate that secures and supports a base of the wheelless and trackless powered walk-behind construction equipment, the plate further pivotally connects to a bottom of a shaft, the top of the shaft supporting a shaft holder that projects outward perpendicularly from the shaft; a lifting device comprising an L-shaped tubing having a double open-ended leg portion that movably receives the shaft and a foot portion perpendicularly connects to an end of the leg portion, a linear actuator movably connects the shaft holder to the foot portion, a linear actuator further attaches to the foot portion to project a threaded rod that rotationally engages a threaded rod holder supported by the shaft holder in a manner that the engagement of the threaded rod moves the shaft along a hollow interior of the leg portion; the foot portion further connects the vehicle-mounted transportation lift to a motorized vehicle; wherein activation of the linear actuator moves the shaft relative to the L-shaped tubing to move the cradle either away from or closer to a ground;
  (B) providing the wheelless and trackless, powered, walk-behind construction equipment;
  (C) connecting the vehicle-mounted transportation lift to the motorized vehicle;
  (D) activating a first time the vehicle-mounted transportation lift to bring the plate proximate to a ground;
  (E) loading the wheelless or trackless, powered walk behind construction equipment upon the plate;
  (F) activating a second time the vehicle-mounted transportation lift to move the cradle and loaded wheelless and trackless, powered, walk-behind construction equipment away from the ground; and
  (G) moving the motorized vehicle, the attached vehicle-mounted transportation lift and the loaded wheelless and trackless, powered, walk-behind construction equipment to a remote site.

8. The method of claim 7 wherein the activating a second time the vehicle-mounted transportation lift further comprises a step of reversing a rotational direction of the threaded rod used in the activating a first time the vehicle-mounted transportation lift.

9. The method of claim 7 wherein the activating a second time the vehicle-mounted transportation lift further comprises a step of moving the shaft through a hollow interior of the leg portion while the L-shape tube stays stationary relative to the motorized vehicle.

10. The method of claim 7 wherein the connecting the vehicle-mounted transportation lift to a motorized vehicle further comprises a step of pivotally attaching the foot portion to the motorized vehicle.

11. The method of claim 7 further comprises a step of removably securing the wheelless or trackless, powered, walk-behind construction equipment to the cradle by a pin that removably connects two upright side walls of the cradle.

12. The method of claim 7 wherein the activating a first time the vehicle-mounted transportation lift further comprises a step of passing the threaded rod through the shaft holder.

13. A vehicle-mounted transportation lift used for transporting wheelless and trackless, powered, walk-behind construction equipment comprising:
  (A) a cradle comprising a plate that secures and supports a base of the wheelless and trackless, powered, walk-behind construction equipment, the plate pivotally connects to a bottom of a shaft, a top of the shaft supporting a shaft holder that projects outward perpendicularly from the shaft;
  (B) a lifting device comprising an L-shaped tubing featuring a double open-ended leg portion that movably slides over the shaft and a foot portion perpendicularly connects to a bottom of the leg portion, a linear actuator that attaches to the shaft holder to project a threaded rod to movably engage a threaded rod holder, the foot portion supports the threaded rod holder in a manner that a rotation of the threaded rod moves the shaft along a hollow interior of the leg portion, the foot portion further connects the vehicle-mounted transportation lift to a motorized vehicle;

wherein activation of the linear actuator moves the cradle either away from or closer to a ground.

14. The vehicle-mounted transportation lift of claim 13 wherein the vehicle-mounted transportation lift can pivot relative to the motorized vehicle to provide vehicle-mounted transportation lift with a vertical operating position and a horizontal storage position.

15. The vehicle-mounted transportation lift of claim 14 wherein the foot portion is pivotally connected to motorized vehicle.

16. The vehicle-mounted transportation lift of claim 13 wherein the L-shaped tubing stays stationary relative to the motorized vehicle while the shaft moves through a hollow interior of the leg portion upon activation of the linear actuator to pass the threaded rod through the foot portion.

17. The vehicle-mounted transportation lift of claim 13 wherein the vehicle-mounted transportation lift is removably connected to the motorized vehicle.

18. The vehicle-mounted transportation lift of claim 17 wherein the plate further supports a set of wheels by which the operator can move the vehicle-mounted transportation lift away from the vehicle when the vehicle-mounted transportation lift is disconnected from the motorized vehicle.

19. A method of operating a vehicle-mounted transportation lift used for transporting wheelless and trackless, powered, walk-behind construction equipment comprising the following steps:
  (A) providing the vehicle-mounted transportation lift used for transporting wheelless and trackless, powered, walk-behind construction equipment, the vehicle-mounted transportation lift comprising a cradle featuring a plate that secures and supports a base of the wheelless and trackless powered walk-behind equipment, the plate pivotally connects to a bottom of a shaft to provide the plate with an open horizontal operational position and vertical stowed position, the top of the shaft supporting a shaft holder that projects outward perpendicularly from the shaft; a lifting device comprising an L-shaped tubing having a double open-ended leg portion that movably receives the shaft and a foot portion perpendicularly connected to an end of the leg portion, a linear actuator that attaches to the shaft holder to project a threaded rod to movably engage a threaded rod holder as supported by the foot portion in a manner that a rotation of the threaded rod moves the shaft along a hollow interior of the leg portion; the foot portion further connects the lift to a motorized vehicle; wherein activation of the linear actuator moves the shaft relative to the L-shaped tubing to move the cradle either away from or closer to a ground;
  (B) providing the wheelless and trackless, powered, walk-behind construction equipment;
  (C) connecting the vehicle-mounted transportation lift to a motorized vehicle;
  (D) activating a first time the vehicle-mounted transportation lift to bring the plate proximate to a ground;
  (E) loading the wheelless or trackless, powered walk behind construction equipment upon the plate;
  (F) activating a second time the vehicle-mounted transportation lift to move the cradle and loaded wheelless and trackless, powered, walk-behind construction equipment away from the ground; and
  (G) moving the motorized vehicle, the attached vehicle-mounted transportation lift and the loaded wheelless and trackless, powered, walk-behind construction equipment to a remote site.

20. The method of claim 19 wherein the activating a second time the vehicle-mounted transportation lift further comprises a step of reversing a rotational direction of the threaded rod used in the activating a first time the vehicle-mounted transportation lift.

21. The method of claim 19 wherein the activating a second time the vehicle-mounted transportation lift further comprises a step of moving the shaft through a hollow interior of the leg portion while the L-shape tube stays stationary relative to the vehicle.

22. The method of claim 19 further comprises a step of removably securing the wheelless or trackless, powered, walk-behind construction equipment to the cradle by a pin that removably connects two upright side walls of the cradle.

23. The method of claim 19 wherein the activating a first time the vehicle-mounted transportation lift further comprises a step of passing the threaded rod through the foot portion.

* * * * *